(12) United States Patent
Reuter et al.

(10) Patent No.: US 7,040,090 B2
(45) Date of Patent: May 9, 2006

(54) SERVO STEERING SYSTEM FOR MOTOR VEHICLES

(75) Inventors: Wolfgang Reuter, Florstadt (DE); Johannes Schmid, Schwaebisch Gmuend (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 0 days.

(21) Appl. No.: 10/501,745

(22) PCT Filed: Dec. 12, 2002

(86) PCT No.: PCT/EP02/14112

§ 371 (c)(1),
(2), (4) Date: Aug. 2, 2004

(87) PCT Pub. No.: WO03/055733

PCT Pub. Date: Jul. 10, 2003

(65) Prior Publication Data

US 2005/0050885 A1    Mar. 10, 2005

(30) Foreign Application Priority Data

Jan. 3, 2002    (DE) .............................. 102 00 092

(51) Int. Cl.
*F16D 31/02* (2006.01)
(52) U.S. Cl. .......................... 60/433; 60/468
(58) Field of Classification Search .................. 60/433, 60/434, 468
See application file for complete search history.

(56) References Cited

U.S. PATENT DOCUMENTS

| | | | |
|---|---|---|---|
| 3,153,900 A * | 10/1964 | Pigeroulet et al. ............ | 60/468 |
| 3,971,216 A * | 7/1976 | Miller ........................... | 60/484 |
| 4,673,162 A | 6/1987 | Lachmann | |
| 4,798,050 A * | 1/1989 | Nakamura et al. ............ | 60/468 |
| 5,048,628 A * | 9/1991 | Rayner ......................... | 60/468 |
| 5,439,070 A * | 8/1995 | Haga et al. .................. | 180/421 |
| 5,651,423 A * | 7/1997 | Haga et al. .................. | 180/403 |
| 5,760,892 A * | 6/1998 | Koyama .................. | 356/237.1 |
| 6,119,803 A * | 9/2000 | Suzuki et al. ............... | 180/429 |
| 6,390,228 B1 * | 5/2002 | Serizawa et al. ........... | 180/403 |

FOREIGN PATENT DOCUMENTS

| | | |
|---|---|---|
| DE | 37 29 156 | 3/1988 |
| DE | 37 33 642 | 4/1989 |
| DE | 40 01 306 | 7/1991 |
| DE | 44 35 148 | 1/1996 |
| DE | 195 42 275 | 5/1997 |
| EP | 0 089 512 | 9/1983 |
| EP | 0 189 965 | 3/1989 |
| EP | 1 149 755 | 10/2001 |

\* cited by examiner

*Primary Examiner*—Edward K. Look
*Assistant Examiner*—Michael Leslie
(74) *Attorney, Agent, or Firm*—Jordan and Hamburg LLP

(57) ABSTRACT

For a power assisted steering system for vehicles, in particular passenger cars, there is provided a hydraulic circuit with a servopump, a three-way flow regulator valve which is located at the junction between the pump and a servoactuator and has a measuring throttle, located in the inflow to the servoactuator, as a fixed throttle and an outflow throttle which is located in a bypass of the latter and which determines a variable throttle cross section by means of a piston which is charged alternately as a pressure compensator. The piston, which is charged via an active actuator element, changes the outflow throttle cross section as a function of the current applied in order to change the volume flow which passes via the measuring throttle.

9 Claims, 1 Drawing Sheet

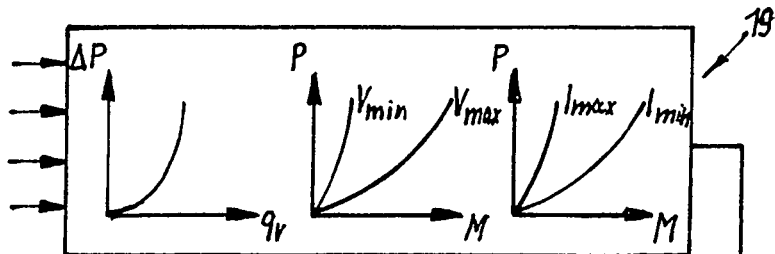
Fig. 1
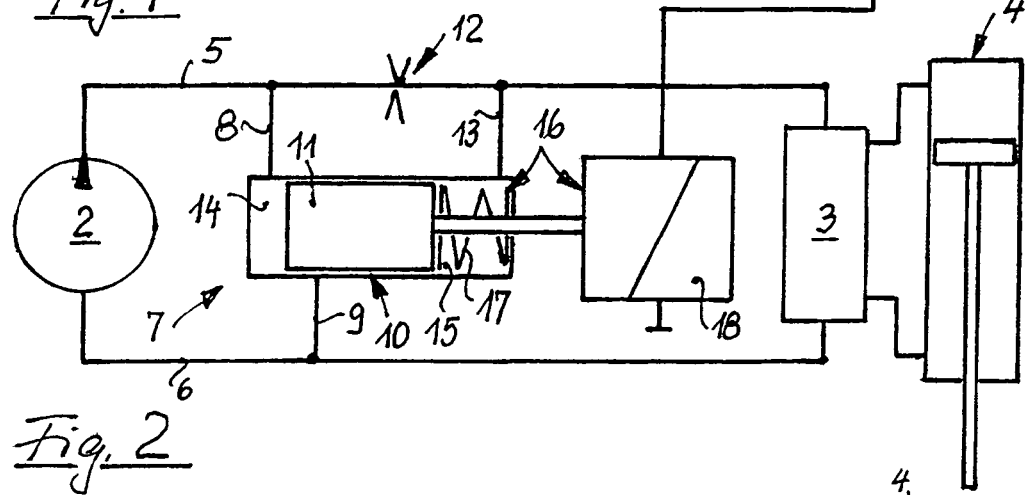
Fig. 2
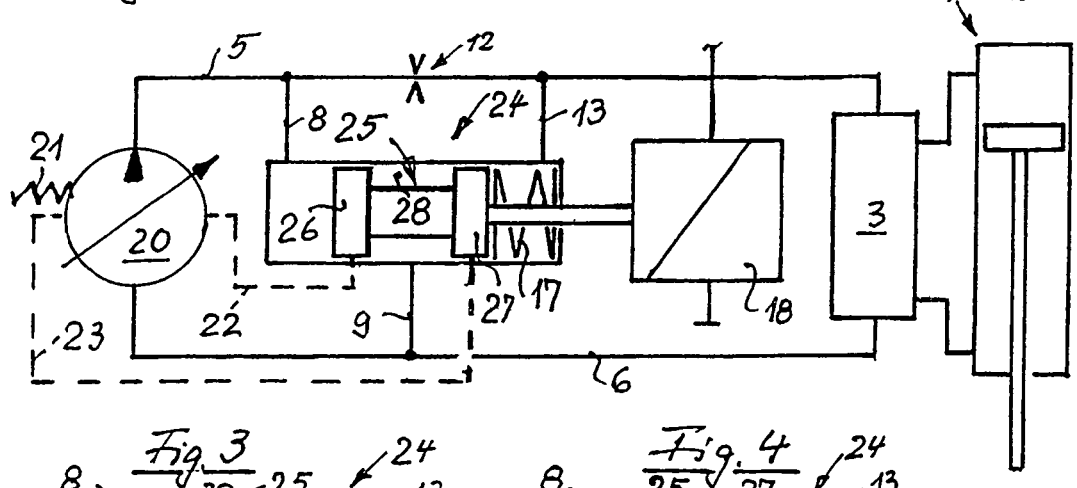
Fig. 3
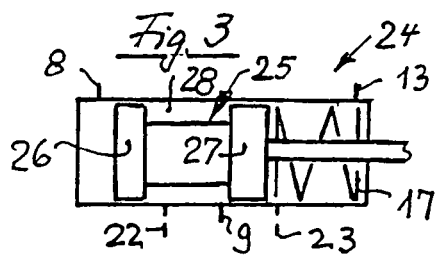
Fig. 4
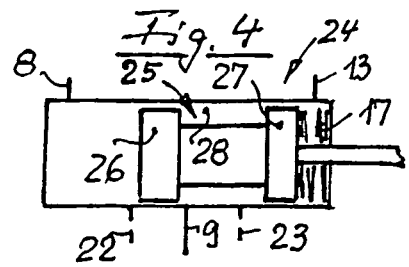

SERVO STEERING SYSTEM FOR MOTOR VEHICLES

BACKGROUND OF THE INVENTION

The invention relates to a power assisted steering system for vehicles, in particular passenger cars.

More and more is being demanded of power assisted steering systems as comfort requirements increase and also as a result of the interplay with other systems for controlling the dynamics of vehicle movement. Accordingly, the respective power assistance, which is in some cases relatively large, is to be ensured even in extreme situations in which changes to the usual steering behavior are particularly critical, including in terms of the driver's reaction. The ability to continuously make use of even large volume flows which this entails requires large pump capacities which reduce the engine capacity which can be used in other ways, and increases the consumption of fuel.

In order to counteract this, and especially to improve the steering sensation, DE 37 29 156 C2 provides a valve arrangement in the connection between the pump and the servo actuator which connects the forward flow and return flow of said connection as a bypass and determine, as a function of parameters which are decisive for the necessary power assistance, such as torque applied to the steering wheel by the driver, the rotary angle of the steering wheel, travel speed, pressure acting on the servo actuator and the like, the portions of the feed volume of the pump which are fed, as utilized volume portion (useful power) to the servo actuator or are fed back directly to the return flow line as an unused volume portion (power loss).

The valve arrangement which is located in the bypass is embodied as a slide valve whose slide can be charged in a pressure-compensated fashion and superimposed for the sake of spring loading on its open position by means of an actuating magnet by means of which the slide can be adjusted as a function of the current applied and actuated by means of the control unit, in direction of its blocking position which closes off the overflow cross section.

Furthermore, a power assisted steering system of the type mentioned at the beginning is known from EP 0 189 965 B1 in which a three-way flow regulator valve is located at the junction between the steering assistance pump which is embodied there as a constant delivery pump and the servo actuator and the return flow which controls the portion of the feed flow of the pump which is fed to the servo actuator as a used portion by means of an adjustment throttle whose throttle cross section can be adjusted by means of a magnet actuator as a function of parameters such as travel speed, angle of rotation of the steering wheel and the like which are decisive for the power assistance effect. The magnitude of the volume flow which passes via the cross section of the adjustment throttle or of the pressure difference which is sat in accordance with this throttle cross section is used to determine the overflow cross section or throughflow cross section to the return flow line. This is determined by means of a regulating piston which is embodied as a pressure compensator and which is charged on the one hand by the pressure provided to the adjustment throttle on the inflow side and on the other hand by the pressure which is applied to the adjustment throttle on the outflow side, supplemented by a compensation spring as actuator element.

Due to this design, irrespective of the magnitude of the opening cross section of the adjustment throttle, which at the same time forms a measurement throttle, throttle losses result with respect to the portion of the feed volume of the pump which is fed to the servo actuator as the configuration as an adjustment throttle gives rise to certain cross-sectional restrictions. This results in efficiency losses in particular with respect to small throttle cross sections for operating the steering system with a low level of power assistance. Furthermore, due to the fact that actuation is carried out by means of the control unit and the magnet actuator, such a system results in respectively corresponding pressure differences arising at the adjustment throttle in its function as a measurement throttle before the clear cross section can be correspondingly set to the return flow line by means of the regulating piston which is embodied as a pressure compensator.

SUMMARY OF THE INVENTION

The invention relates to improving a power assisted steering system of the type mentioned at the beginning in order to improve the efficiency and/or the timing response, and thus also the steering sensation and/or to make it resistant to pressure fluctuations which originate from the steering system so that a robust system is produced.

A fixed throttle is provided as the measurement throttle and is able to have such large cross-sectional dimensions that only slight throttle losses occur with respect to the operating ranges in which the throttle is generally mainly operated and in which only a low level of power assistance is required and in which therefore only a small volume flow flows across the measurement throttle. In addition, as a result of the fact that the actuating force of the actuator element is actively variable with effect of varying the volume flow so that the opening cross section can be actively varied in a way which is superimposed on the volume-flow-dependent adjustment of this opening cross section of the outflow throttle as overflow cross section, said adjustment being carried out by means of the pressure compensator, in particular by means of a regulating piston as pressure compensator, for which purpose, within the scope of the invention, in particular an actuator member which can be adjusted as a function of the current applied can be provided. In particular such an actuator member—as a force actuator—is formed by a magnet actuator by means of which the pressure compensator or the regulating piston which forms the pressure compensator can be charged directly or indirectly, the respective actuating force which is applied by means of the magnet actuator resulting in a brief incorrect adjustment of the pressure compensator until the change in the volume flow has resulted in the pressure equilibrium which is to be established with respect to the actuating force of the magnet actuator is formed.

It proves particularly expedient within the scope of the invention to provide, as actuator element, a force actuator, in particular a magnet actuator, in a parallel connection with a spring. Of course, it is, however also possible to arrange, as actuator element, two actuator members, in particular a flow-dividing actuator, for example a spindle actuator, and a spring in a series connection, for example by virtue of the fact that the spring actuator is supported against the piston by means of the spring, the actuation path which determines the opening cross section being dependent on the opposing force which acts in the opposite direction.

The actively variable charging of the pressure compensator or of the regulating piston which forms the pressure compensator also proves particularly expedient for engaging, in a way which is superimposed on the parameters which usually determine the power assistance effect, if this is expedient with respect to irregularities in terms of the dynamics of vehicle movement, and particularly short reaction times are required.

The invention may be used in conjunction with constant delivery pumps and adjustable pumps, particularly expedient and energy saving solution being the combination of an adjustable pump and a pressure compensator for regulating the adjustable pump.

Further details and features of the invention emerge from the subclaims. In addition, the invention will be explained in more detail below by reference to two highly simplified representations of the hydraulic part of a power assisted steering system,

BRIEF DESCRIPTION OF THE DRAWINGS

FIG. 1 showing a solution with a constant delivery pump,
FIG. 2 showing a solution with an adjustable pump, and
FIGS. 3 and 4 showing various positions of a pressure compensator which is located in the actuation for the adjustable pump and operates as an outflow throttle.

The hydraulic circuit 1 which is illustrated in FIG. 1 comprises a constant delivery pump 2 as a steering assisting pump, which acts via a steering valve 3 on a servo actuator 4 which is illustrated symbolically as a hydraulic cylinder, and acts on the steering linkage of the steerable wheels.

The hydraulic circuit 1 comprises, in the line connection from the constant delivery pump 2 to the steering valve 3, a high-pressure-end forward line 5 and a low-pressure-end return flow line 6 as well as, connecting these, a bypass 7 in which an outflow throttle 10 which is variable in its throttle cross section is located and is connected via line sections 8 and 9. Said outflow throttle 10 is constructed in the form of a slide valve whose piston 11 determines the size of the variable throttle cross section or overflow cross section as a function of its position.

DESCRIPTION OF THE PREFERRED EMBODIMENTS

A measuring throttle 12 is arranged in the forward flow line 5, and the line section 8 of the bypass 7 branches off from the forward flow line 5 on the inflow side, that is to say upstream of the measuring throttle 12. On the outflow side, that is to say downstream of the measuring throttle 12, a line 13 branches off from the forward flow line 5 and opens at the outflow throttle end at the rear of the piston 11 into said outflow throttle so that the piston 11 is located between the pressure chambers 14 and 15 and forms a pressure compensator which is additionally charged at the rear via an actuator element 16 in the schematically illustrated exemplary embodiment.

The actuator element 16 comprises, in the exemplary embodiment, two actuator members 17 and 18, the actuator member 17 being embodied as a spring, and the actuator member 18 being embodied as a force actuator which is formed by a magnet actuator. In this combination for the configuration of the actuator element 16, it proves expedient if, as illustrated in the drawing, the actuator members 17 and 18 charge the piston 11 when connected in parallel.

Basically, it is however also possible within the scope of the invention to provide for the actuator members to be connected in series, such series connection proving advantageous in particular if the actuator member 18 is embodied as a flow-dividing actuator, for example as a spindle actuator, which is not shown in the drawing.

With respect to the illustration which is shown with a parallel connection of the actuator member 17 and 18 of the actuator element 16 and the actuator member 18 embodied as a magnet actuator, the basic configuration of the outflow throttle 10 corresponds to a three-way flow regulator valve in which the pressure difference which arises at the measurement throttle 12 is compensated by means of the spring as actuating number 17.

If the measuring throttle 12 is embodied according to the invention as an orifice with relatively large free passage cross section, these losses can be significantly reduced. The volume-flow-changing actuation of the flow regulator valve is then carried out according to the invention by directly actuating the outflow throttle 10 by means of the actuator element 16 and its charging of the piston 11—which serves as pressure compensator—via the actuator member 18.

The actuation of the actuating number 18 is indicated schematically by means of the control unit 19 in which, with respect to the measurement throttle 12 which is embodied as a fixed throttle, the volume flow which corresponds to the pressure difference between the pressure provided on the inflow side and the pressure provided on the outflow side with respect to the measurement throttle 12 is determined as an output value Q, or is sensed in terms of the characteristic curves so that, by influencing the outflow throttle 10 the volume flow passing via the throttle 12 can be adapted to a set point value $Q_{setp}$ in accordance with the requirements which are made with respect to the power assistance. The adaptation carried out as a function of the current applied, by assigning a respective application current to the respective volume flow. The assignment can be made in computational terms or on the basis of characteristic curve fields in which the volume flows are sensed as a function of pressure difference and as a function of the current applied.

The invention may be used both in conjunction with servo pumps which are embodied as constant delivery pumps and servo pumps which operate as adjustable pumps. In particular in conjunction with constant delivery pumps, it is appropriate to use measurement throttles 12 with relatively large free passage cross section, embodied if appropriate as orifices, to achieve the aimed at saving of energy if the pumps are operated as a function of the engine speed as generally only a low level of power assistance is required or desired at high rotational speeds of the combustion engine of the vehicle. However, the feed volume rises with the rotational speed.

One expedient development of the invention is therefore also to use adjustable pumps, that is to say pumps in which the stroke volume which can be used can be varied, for example by means of a known hydraulic stroke ring adjustment, which provides the possibility of more or less compensating changes in the feed volume which are dependent on the drive speed. The use of an outflow throttle in the configuration as a pressure compensator provides, as explained below by the aforesaid FIGS. 2 to 4, a favorable approach for controlling the feed volume of the adjustment pump according to requirements with little expenditure. In the explanation of FIGS. 2 to 4, identical reference symbols are used to those in FIG. 1 where there is functional correspondence.

In contrast to FIG. 1, the embodiments of the servo pump is referred to as an adjustable pump 20, it being illustrated by means of the spring 21 that the adjustable pump 20 is loaded to an output position in which the required volume flow corresponds to an output value $Q_{setp}$, as has been defined by the control unit 19 by means of the magnet actuator 18 as actuator member. From this output position, the adjustable pump 20 can be adjusted by hydraulic adjustment of the stroke ring (not illustrated). The hydraulic actuation of the adjustable pump 20 is carried out by means of control lines 22 and 23 which are connected to the outflow throttle 24 which is embodied as a pressure compensator and which has a control slide 25 which has an annular groove 28 which lies between two control pistons 26, 27.

In the illustration according to FIG. 2, the control lines 22 and 23 are covered at their connections to the outflow throttle 24 by the control pistons 26, 27.

FIG. 3 illustrates a situation in which the volume flow $Q_{act}$ which is fed by the adjustable pump 20 is smaller than a volume flow $Q_{setp}$ which is predefined by means of the control unit 19. The adjustable pump 20 has to be correspondingly opened, the connection between the line section 9 which is connected to the return flow line 6 and the control line 22 being established by means of the control slide 25 so that the control line 22 is under low pressure, while the control line 23 is connected to the forward flow line 5 via the line 13 upstream of the measurement throttle 12, said control line 23 thus being under high pressure so that the stroke ring of the adjustable pump 20 is adjusted until a state of equilibrium is established across the pressure compensator, as is illustrated in FIG. 2.

FIG. 4 shows a contrasting situation, the volume flow $Q_{act}$ which is fed via the adjustment pump 20 is greater than the volume flow $Q_{setp}$ which is predefined by means of the control unit 19. Accordingly, the setting of the adjustment pump 20 must be reduced, for which purpose the control slide 25 assumes a position according to FIG. 4 in which the control line 22 is connected to the high pressure side, and the control line 23 is connected to the low pressure side. For this purpose, the connection between the line section 8 which branches off from the forward flow line 5 upstream of the outflow throttle 12, and the control line 22 is cleared, while the control line 23 is connected to the return flow line 6 by means of the ring space 28 via the line section 9 so that the stroke ring is hydraulically charged in the actuation position of the control slide 25 according to FIG. 4 in a way which is opposed to the situation according to FIG. 3.

The control expenditure on the adjustable pump 20 is minimized with this solution according to the invention, and the potential of a large saving of energy can thus be obtained with relatively low expenditure.

Overall, the formation of the hydraulic circuit 1 with a servo pump 2 or 20 with a three-way flow regulator valve which is located at the junction between the pump 2 or 20 and the servo actuator 4 is provided, said flow regulator valve having a measurement throttle 12 as a fixed throttle which is located in the inflow to the servo actuator 4, and an outflow throttle 10 or 24 which is located in a bypass of the latter and which determines, by means of a piston 11 or slide 24 which is charged alternately as a pressure compensator, a variable throttle cross section so that the piston 11 or slide 24 is charged via an active actuator member and, as a function of the current applied, changes the outflow throttle cross section in order to change the volume flow which passes via the measurement throttle 12, in which case, when such a power assisted steering system 1 is embodied with a servo pump 20 as adjustable pump, the adjustable pump can also be actuated via the control slide 25 of the pressure compensator, which makes a contribution to simplifying the system.

The invention claimed is:

1. A power assisted steering system for vehicles comprising:

a pump which feeds to a hydraulic servo actuator and a three-way flow regulator valve which is located at the junction between the pump and the servo actuator;

a measuring throttle in a inflow to the servo actuator, said measuring throttle being a fixed throttle;

an outflow throttle located in a bypass of the servo actuator and via which excess flow of the pump is directed;

the outflow throttle having a variable throttle cross section, the cross section being determined by a piston as a pressure compensator;

the piston, with respect to the volume flow which passes via the measuring throttle, being charged by connection to the inflow side and, in the opposite direction thereto, by connection to the outflow side;

the piston being actuated by a first actuating element which has an actuating path dependent on the actuating force and opposing force and a second actuating element having an actively variable actuating force with the effect of varying the volume flow; and the first actuating element being an elastic actuator member and the second actuating element comprising an actuating member which is adjusted as a function of the current applied.

2. The system of claim 1, wherein the elastic actuator member is a spring.

3. The system of claim 2, wherein the actuator members are connected in parallel.

4. The power assisted steering system of claim 1 wherein said pump is a servopump, said seropump being a constant delivery pump.

5. The power assisted steering system of claim 1 wherein pump is a the servopump, said servopump being an adjustable pump.

6. The power assisted steering system of claim 5, wherein the adjustable pump is actuated by the outflow throttle.

7. The power assisted steering system of claim 6, wherein:

the adjustable pump is spring-loaded to an outlet position;

said outlet piston being at an equilibrium position of the pressure compensator and being set in accordance with adjustment of the pressure compensator to a working position for providing the respective required volume flow ($Q_{setp}$).

8. A power assisted steering system comprising:

a plurality of hydraulic components including a pump, a variable cross section outflow throttle and a three-way flow regulator valve;

said hydraulic components being connected in a parallel hydraulic loop between a common first hydraulic line and a common second hydraulic line so that said outflow throttle is disposed between said pump and said regulator valve;

said first hydraulic line being a high pressure forward line;

said second hydraulic line being a low pressure return line;

said outflow throttle including a piston charged by said first hydraulic line;

said piston being actuated by a combination of first and second actuators, said first actuator being an elastic actuator;

said system further comprising a control unit and a measuring throttle in communication with said control unit, said measuring throttle being disposed in said first hydraulic line for determining a flow through said line; and said second actuator being controllable by said control unit for varying a flow volume through said loop.

9. The system of claim 8, wherein the second actuator is a magnetic actuator that is controllable by an applied current.

* * * * *